INVENTORS
LLOYD W. ALLEN
RUDOLPH W. BUNTENBACH
BY
Lippincott & Smith
ATTORNEYS

FIG.5

March 1, 1960 L. W. ALLEN ET AL 2,927,215
HIGH-SPEED PHOTOGRAPHIC APPARATUS
Filed May 7, 1957 7 Sheets-Sheet 4

INVENTORS
LLOYD W. ALLEN
RUDOLPH W. BUNTENBACH
BY
Lippincott & Smith
ATTORNEYS

INVENTORS
LLOYD W. ALLEN
RUDOLPH W. BUNTENBACH
BY Lippincott & Smith
ATTORNEYS

United States Patent Office 2,927,215
Patented Mar. 1, 1960

2,927,215

HIGH-SPEED PHOTOGRAPHIC APPARATUS

Lloyd W. Allen, Livermore, and Rudolph W. Buntenbach, Lafayette, Calif., assignors, by mesne assignments, to the United States of America as represented by the United States Atomic Energy Commission Application May 7, 1957, Serial No. 657,623

14 Claims. (Cl. 250—217)

This invention relates to apparatus for making high-speed multiple-exposure photographs showing successive aspects of rapidly changing events, such as explosions.

Heretofore, multiple-exposure photographs of rapidly changing events, such as explosions, have usually been made with special cameras employing rotating prisms, mirrors, or the like, for producing in rapid succession a plurality of spatially separated optical images upon a photographic film. The mechanical complexity, size, expensiveness, and lack of versatility in such special cameras present practical disadvantages of considerable significance. The copending U.S. patent application of Rudolph W. Buntenbach, Serial No. 552,411, filed 12 December 1955, now Patent No. 2,871,400, and assigned to the same assignee as the present application, discloses high-speed multiple-exposure apparatus wherein an electron image tube acts as a high-speed photographic shutter and is provided with electron deflection means operable to provide a plurality of spatially separated reproductions of an optical image that can be photographed with an ordinary camera. The present invention also employs an electron image tube, and provides improved and simplified deflecting and synchronizing circuits that increase the speed and versatility of the apparatus.

Briefly stated, according to certain aspects of this invention, an electron image tube having a photoemissive cathode and a cathodoluminescent anode is also provided with a negatively biased control grid, with electron image focusing means, and with electron-deflection means. The control grid controls the flow of electrons between the cathode and anode, as will be explained in greater detail hereinafter. The electron-image focusing means focuses on a portion of the anode an electron image of an electron pattern emitted by the cathode as hereinafter explained. The electron-deflection means deflects the electron image focused on the anode to a plurality of different positions, selectively. The image-focusing means may be either electrostatic or magnetic. Likewise, the electron-deflecting means may be either electrostatic or magnetic. For best definition and sharpness of the reproduced images, the focusing means is preferably magnetic. However, since magnetic focusing in presently available electron image tubes is dependent not only on the magnetic focus field but also on the control grid voltage, it is preferable in some cases, for example where simpler circuitry is desired, to use electrostatic focusing means. For highest deflection speeds with presently available components, the electrostatic deflection means is preferable. In the present instance, the means preferable for obtaining highest speed with simplest circuitry is illustrated, i.e., electrostatic focus in combination with electrostatic deflection.

A time-varying optical image of the event that is to be photographed is projected onto the photoemissive cathode of the electron image tube, and positive-going voltage pulses are supplied between the negatively biased control grid and the cathode for permitting successive bursts of electron flow from the cathode to the anode. Responsive to electric deflection signals supplied to the electron-deflecting means, successive ones of these bursts are directed to different portions of the cathodoluminescent anode, so that a plurality of spatially separated reproductions of the projected optical image are produced at the anode. These image reproductions, which represent temporally separated aspects of the time-varying projected image, may be photographed by an ordinary camera set with its mechanical shutter open during an entire sequence of exposures. Thus, the electron image tube acts both as a high-speed photographic shutter and as a means for spatially separating successive reproduced images. By this means several aspects of the time-varying projected image can be photographed in rapid succession. For example, five successive aspects of a rapidly changing event have been photographed within a time interval as short as one microsecond.

For such rapid operation, it is evident that the generation and synchronization of the electric deflection signals and the positive-going voltage pulses that control the exposure times present formidable problems. Furthermore, for versatility of operation, the duration of each exposure, the time interval between exposures, and the spatial separation of the reproduced images should each be capable of individual adjustment over a considerable range of values. The present invention solves these problems in a superior manner.

The apparatus receives an initial electric pulse (produced in any desired manner) that signals the beginning of the event (or a selected portion of the event) that is to be photographed. Responsive to this initial pulse, electrical delay means hereinafter described provide three periodic pluralities of successive electric pulses so timed that pulses of the first, second and third pluralities occur alternately in the order named. Pulses of the first plurality each cause the starting of a change in the amount of image deflection; pulses of the second plurality each cause the stopping of a change in the amount of image deflection; pulses of the third plurality, and also the initial pulse, cause the image exposure to start. Pulses of the first and second pluralities cause image deflection by controlling an integrating circuit, which can be, for example, a capacitor which is charged (or discharged; or capacitors which are charged and discharged, respectively) at a constant rate during each of the time intervals between each pulse of the first plurality and the next following pulse of the second plurality to provide a staircase waveform voltage (or voltages) that controls the electron-deflecting means of the electron image tube. Responsive to each pulse of the initial pulse and the third plurality, an exposure pulse generator supplies a positive-going voltage pulse between the control grid and the cathode of the electron image tube to produce a photographic exposure. It is evident that the aforesaid positive-going voltage pulse can be provided either by supplying a positive-going potential pulse to the control grid or by supplying a negative-going potential pulse to the cathode. Preferably, the latter is done.

The delay means are adjustable for adjusting the time intervals between successive pulses of the first plurality to adjust the time intervals between the successive exposures. The delay means are also adjustable for adjusting the time intervals between each pulse of the first plurality and the next following pulse of the second plurality to adjust the spatial separations of the reproduced images. The time interval between each pulse of the second plurality and the next following pulse of the third plurality need not be varied, and preferably has a fixed value. The exposure pulse generator is adjustable for adjusting the duration of each positive-going voltage pulse supplied between the control grid and the cathode of the electron image tube. In this manner, adjustment of the exposure pulse generator adjusts the duration of each exposure.

The foregoing and other aspects of this invention may be better understood from the following description of illustrative examples taken in connection with the accompanying drawings. The scope of the invention is pointed out in the appended claims.

Figure 1:
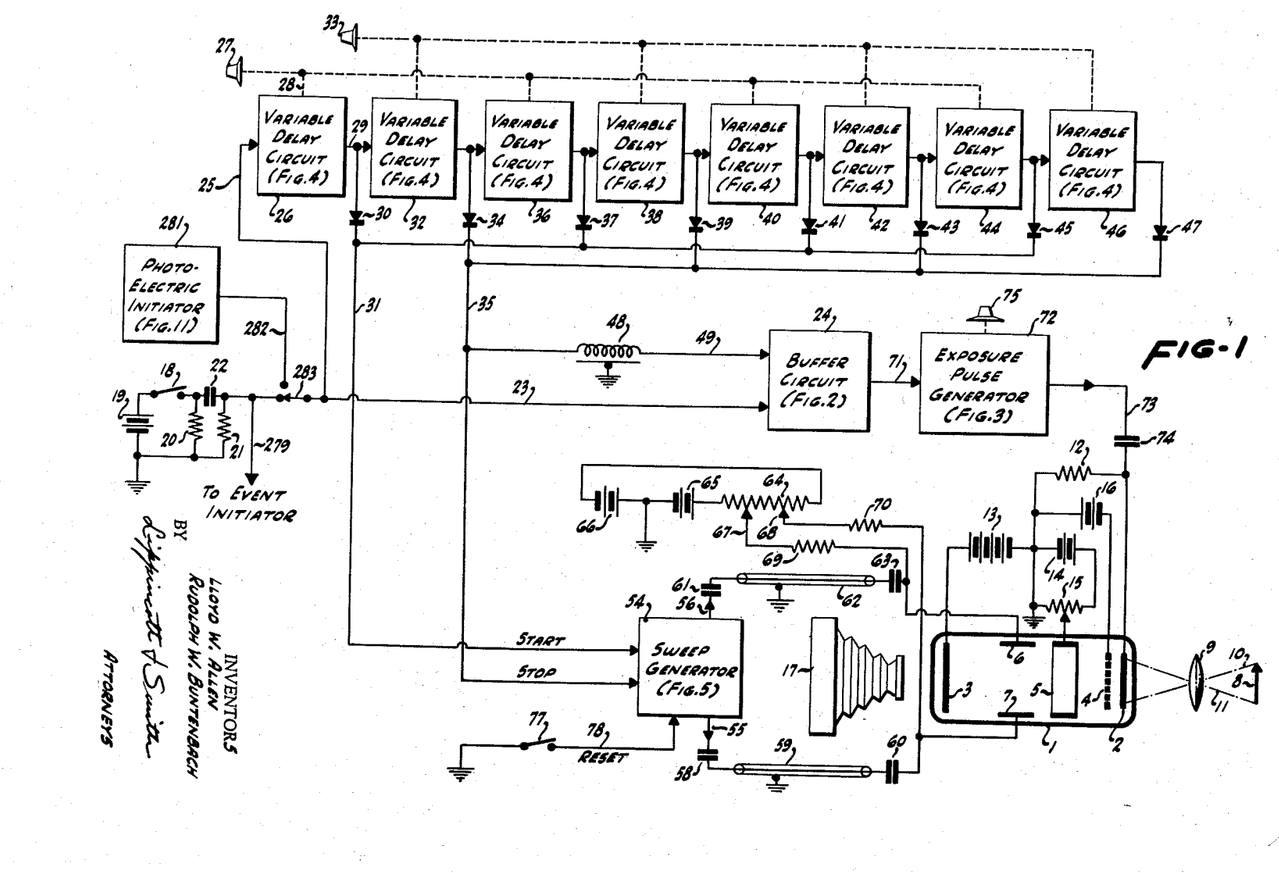
Fig. 1 is a schematic diagram of an improved high-speed multiple-exposure apparatus for photographing rapidly changing events.

Referring to Fig. 1 of the drawings, an electron image tube comprises an evacuated glass envelope 1 containing a planar photoemissive cathode 2 and a planar cathodoluminescent anode 3 respectively disposed at opposite ends of envelope 1 and parallel to each other. Within the evacuated envelope and between the cathode and the anode, there is a control grid 4, a focusing electrode 5, and a pair of electron-deflecting electrodes 6 and 7. A rapidly changing event that is to be photographed is represented in the drawing by arrow 8. An optical system, such as lens 9, projects a time-varying optical image of event 8 upon cathode 2. Typical light rays between event 8 and cathode 2 are represented by broken lines 10 and 11. The cathode emits a time-varying pattern of electrons that corresponds to the projected optical image, thereby forming at the cathode a time-varying electron image. The cathode is connected to circuit ground or its equivalent through a resistor 12.

The anode 3 is maintained at an electric potential in the order of several thousand volts positive relative to cathode 2 by a suitable power supply represented in the drawing by a battery 13. Electrons flowing between cathode 2 and anode 3 (at certain times as hereinafter explained) are focused into an electron image upon a portion of anode 3 by the electrostatic focusing electrode 5, which is supplied with an adjustable focusing potential by suitable means such as a battery 14 and a potentiometer 15 connected as shown. As the electrons strike cathodoluminescent anode 3, the optical image projected onto cathode 2 is reproduced at anode 3 in a manner that is well known to those skilled in the art. The electron image, and therefore the reproduced optical image, can be deflected to different portions of anode 3 by appropriate deflection voltages applied between deflection electrodes 6 and 7, as is hereinafter more fully explained.

Control grid 4 is connected to a negative bias voltage supply, represented by a battery 16, which supplies between the control grid and the cathode a negative bias voltage of sufficient magnitude to cut off the flow of electrons between the cathode and the anode except during intervals when positive-going voltage pulses are provided between the control grid and the cathode in additive relation to the bias voltage in the manner hereinafter explained. As herein used, the term "positive-going voltage pulses" means pulses that make the control grid potential momentarily more positive (less negative) relative to the cathode potential. It is evident that such positive-going voltage pulses can be produced either by supplying positive-going potential pulses to the control grid or by supplying negative-going potential pulses to the cathode. In the preferred embodiment illustrated, negative-going pulses are supplied to the cathode. Each such pulse permits a burst of electron flow to anode 3, which reproduces at the anode an instantaneous aspect of the optical image projected onto cathode 2.

The deflection voltage provided between electrodes 6 and 7 changes in value between successive ones of these bursts, so that successive bursts of electrons are deflected to different portions of anode 3 to provide at the anode a plurality of spatially separated optical image reproductions corresponding to successive aspects of the time-varying optical image projected onto cathode 2. These spatially separated image reproductions may be photographed by a conventional camera 17 set to have its conventional mechanical shutter open during an entire sequence of exposures. Thus, electron image tube 1 acts as a high-speed photographic shutter for camera 17, and also provides spatial separation of the successively reproduced images. The successive reproduced images are recorded on the photographic film within camera 17 with spatial separations corresponding to those of the reproduced images at anode 3.

For initiating a sequence of exposures, an initial electric pulse is provided by any suitable means at the beginning of the event (or a selected portion of the event) that is to be photographed. In Fig. 1, means for producing the initial electric pulse is represented by a switch 18, a battery 19, two resistors 20 and 21, and a capacitor 22, connected as shown. When switch 18 is closed, battery 19 produces a sudden rise in voltage across resistor 20, and the charging of capacitor 22 through resistor 21 produces the positive-going initial electric pulse for setting the photographic apparatus into operation. This pulse can also be transmitted to a detonator or other device for initiating the explosion or other event that is to be photographed. Alternatively, the initial pulse for starting the photographic apparatus may be supplied by the photoelectric initiator illustrated in Fig. 11 and hereinafter described. Numerous other means for producing the initial pulse will be obvious to those skilled in the art.

The initial pulse is transmitted through a lead 23 to a buffer circuit 24 for purposes hereinafter explained, and is also transmitted through a lead 25 to a variable delay circuit 26. After a time interval that can be adjusted by turning an adjustment knob 27, which is connected to an adjustable element in delay circuit 26 through mechanical linkage represented by broken line 28, delay circuit 26 provides at a lead 29 a positive-going electric pulse that is transmitted through a crystal diode rectifier 30 to a lead 31, and is also transmitted to another variable delay circuit 32. After a further time interval, which can be adjusted by turning an adjustment knob 33, delay circuit 32 supplies a positive-going electric pulse that is transmitted through a crystal diode rectifier 34 to a lead 35 and is also transmitted to still another variable delay circuit 36.

After another time interval, which is adjusted by knob 27, delay circuit 36 provides still another positive-going electric pulse that is transmitted through a crystal diode rectifier 37 to lead 31 and is also transmitted to still another variable delay circuit 38. After a further time interval, which is adjusted by knob 33, delay circuit 38 supplies still another positive-going electric pulse that is transmitted through a crystal diode rectifier 39 to lead 35 and is transmitted to still another variable delay circuit 40. After a further time interval, which is adjusted by knob 27, delay circuit 40 supplies still another positive-going electric pulse that is transmitted through a crystal diode rectifier 41 to lead 31 and is transmitted to still another variable delay circuit 42. After a further time interval, which is adjusted by knob 33, delay circuit 42 supplies still another positive-going electric pulse that is transmitted through a crystal diode rectifier 43 to lead 35 and is transmitted to still another variable delay circuit 44. After a further time interval, which is adjusted by knob 27, delay circuit 44 supplies still another positive-going electric pulse that is transmitted through a crystal diode rectifier 45 to lead 31 and is transmitted to still another variable delay circuit 46. After a further time interval, which is adjusted by knob 33, delay circuit 46 supplies still another positive-going electric pulse that is transmitted through a crystal diode rectifier 47 to lead 35.

It is evident that the plurality of variable delay circuits described above are connected in tandem responsive relation to the initial electric pulse supplied through lead 25. These delay circuits supply to lead 31 the first periodic plurality of four successive positive-going electric pulses following the initial pulse in timed relation, and supply to lead 35 the second periodic plurality of four successive positive-going electric pulses that occur alternately with the pulses of the first plurality. The crystal diode rectifiers, which are poled to present a low resistance to the transmission of positive-going pulses from the delay circuits to leads 31 and 35, present a much higher resistance to the transmission of pulses in the opposite direction and thus prevent the triggering of any delay circuit by an output pulse from any delay circuit other than the one immediately preceding it in the delay circuit chain. Alternatively, instead of rectifiers, buffer amplifiers, or separate output circuits from each delay circuit to the following delay circuit and to leads 31 and 35, may be employed.

Adjustable timing elements within alternate ones of the variable delay circuits are ganged together and mechanically connected to knob 27, and adjustable timing elements within the other alternate ones of the variable delay circuits are ganged together and mechanically connected to adjustment knob 33. Thus, the adjustments of knobs 27 and 33 jointly control the time intervals between successive pulses of the first plurality, and preferably maintain such time intervals substantially equal to one another, while adjustment of knob 33 alone controls (and preferably maintains substantial equality between) the time intervals between each pulse of the first plurality and the next following pulse of the second plurality.

Each pulse of the second plurality is transmitted from lead 35 to a sweep generator 54, hereinafter described, and also from lead 35 to a delay line 48. Thus, a third periodic plurality of four successive positive-going pulses is produced at the output of delay line 48, and is transmitted on a lead 49 to buffer circuit 24. The time delay introduced between each pulse of the second plurality and the next succeeding pulse of the third plurality by delay line 48 is fixed and may be of the order of 0.05 to 0.2 microsecond; the reason for the delay will be given hereinafter. The delay line may be constructed in any of several ways that are familiar to those skilled in the art.

Figure 6:
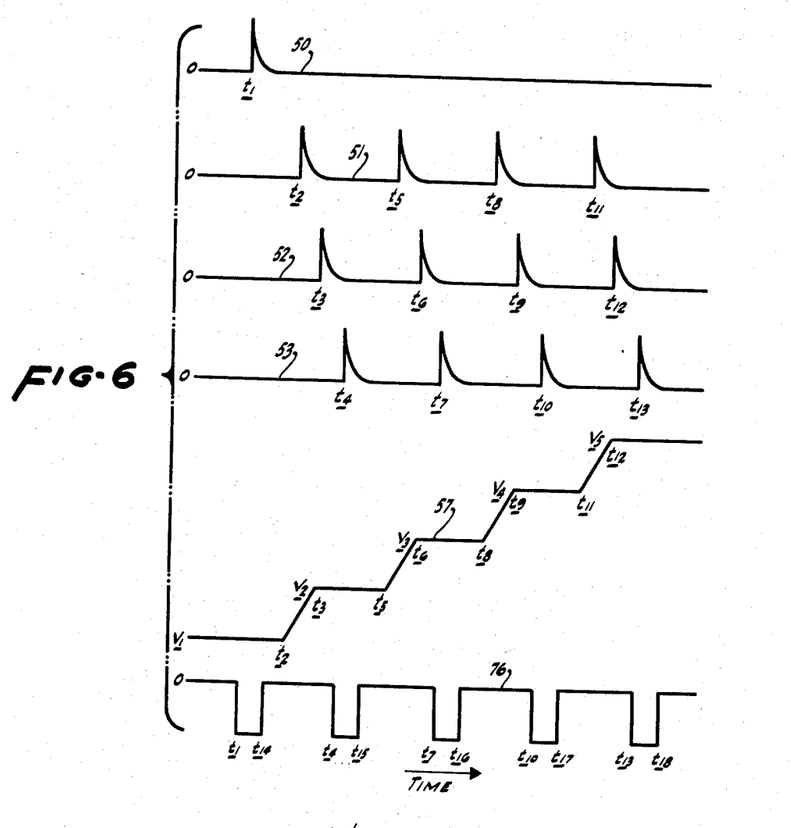
Fig. 6 illustrates a group of electrical waveforms occurring in the operation of the Fig. 1 apparatus.

Referring to Fig. 6, the curves show typical waveform potentials at various points in the circuit during an operating cycle. To facilitate the description, the times of various potential changes are herein referred to as time $t_1$, time $t_2$, etc. Curve 50 represents the initial electric pulse that is supplied to leads 23 and 25 at time $t_1$, upon the closing of switch 18, for example. Curve 51 represents the first plurality of periodic electric pulses that is supplied to lead 31 at times $t_2$, $t_5$, $t_8$ and $t_{11}$. Curve 52 represents the second plurality of periodic electric pulses that is supplied to lead 35 at times $t_3$, $t_6$, $t_9$ and $t_{12}$. Curve 53 represents the third plurality of periodic electric pulses that is supplied through lead 49 at times $t_4$, $t_7$, $t_{10}$, and $t_{13}$. It will be noted that pulses of the first, second, and third pluralities occur alternately in timed relation following the initial pulse.

Again referring to Fig. 1, the first plurality of pulses (supplied to lead 31) and the second plurality of pulses (supplied to lead 35) are transmitted to a sweep generator 54. As is hereinafter more fully explained, sweep generator 54 supplies a positive-going staircase waveform signal to a lead 55 and a negative-going staircase waveform electric signal to a lead 56. The positive-going signal supplied to lead 55 is represented by curve 57 of Fig. 6. The negative-going staircase waveform signal supplied to lead 56 is identical to the signal represented by curve 57 except for a reversal of polarity. These two staircase waveform signals change in value at a constant rate between each pulse of the first plurality and the next following pulse of the second plurality. For example, the staircase waveform 57 starts to change from the potential value $V_1$ at time $t_2$, when the first pulse of the first plurality 51 occurs; the staircase waveform 57 continues changing until time $t_3$, when it has reached a potential value $V_2$, at which time the first pulse of the second plurality occurs and prevents further change in the staircase waveform 57. The staircase waveform signals remain approximately constant in value between each pulse of the second plurality and the next following pulse of the first plurality: for example, the staircase waveform 57 remains approximately constant at potential magnitude $V_2$ from time $t_3$, when the first pulse of the second plurality occurs, until time $t_5$, when the second pulse of the first plurality occurs. The magnitude of each incremental change in the values of the staircase waveform signals can be adjusted by turning knob 33 to adjust the time interval between corresponding pulses of the first and second pluralities; for example, the potential magnitude $(V_2-V_1)$ can be increased by turning knob 33 in a direction to increase the time interval $(t_3-t_2)$. The time interval between the start of successive incremental changes in the values of the two staircase waveform signals can be adjusted by turning knob 27 to adjust the time interval between successive pulses of the first plurality. For example, the time interval $(t_5-t_2)$, which is the interval between pulses of the first plurality 51 and also between the start of successive incremental changes in the potential levels of the staircase waveform 57, can be increased by turning knob 27 in the "increase" direction.

The positive-going staircase waveform signal is transmitted from lead 55 through a capacitor 58, a length of coaxial cable 59, and a capacitor 60 to deflection electrode 7 of the electron image tube. The negative-going staircase waveform signal is transmitted from lead 56 through a capacitor 61, a length of coaxial cable 62, and a capacitor 63 to deflection electrode 6 of the electron image tube. The two staircase waveform signals of opposite polarity provide a plurality of successive stepwise changes in the deflection voltage between electrodes 6 and 7 for deflecting electron bursts in the image tube successively to a plurality of different portions of anode 3.

The initial deflection voltage, and therefore the position of the first electron image focused on anode 3, is controlled as follows: A potentiometer 64 (or a pair of potentiometers, in series or in parallel) is connected between a positive bias voltage source represented by a battery 65, and a negative bias voltage source, represented by a battery 66. Potentiometer 64 is provided with two adjustable taps 67 and 68. Tap 67 is connected to electrode 6 through a resistor 69, and tap 68 is connected to electrode 7 through a resistor 70. Preferably taps 67 and 68 are adjusted so that the initial potential of electrode 6 is positive with respect to cathode 2, while the initial potential of electrode 7 is negative by an equal amount with respect to the cathode 2. Consequently, any electron flow between cathode 2 and anode 3 is initially deflected toward an upper portion of anode 3 as viewed in Fig. 1 (left portion as viewed in Fig. 7).

As the staircase waveform deflection signals are supplied to electrodes 6 and 7, electrode 6 successively becomes less positive (and more negative) while electrode 7 successively becomes less negative (and more positive). Consequently, the electron flow is successively deflected downward (as view in Fig. 1—to the right as viewed in Fig. 7) to a plurality of spatially separated portions of anode 3. During the latter portion of the deflection signals the relative potentials of electrodes 6 and 7 are reversed: that is, the potential of electrode 6 becomes negative with respect to cathode 2, while the potential of electrode 7 becomes positive with respect to cathode 2. The entire operating sequence occurs so rapidly, within a time interval as short as one microsecond, that no substantial change in the charges of capacitors 58, 60, 61 and 63 occurs during a sequence of exposures.

Buffer circuit 24 transmits the initial pulse 50 from lead 23 and the third plurality of pulses 53 from lead 49 through lead 71 to an exposure pulse generator 72. Exposure pulse generator 72 thus receives five successive positive-going pulses, at times $t_1$, $t_4$, $t_7$, $t_{10}$, and $t_{13}$, respectively. Responsive to each of these five pulses, the pulse generator 72 supplies, through a lead 73 and a capacitor 74, a negative-going rectangular pulse of potential to cathode 2. The negative-going pulses that are supplied to cathode 2 by the exposure pulse generator are represented by curve 76 in Fig. 6. The negative-going pulses thus supplied to cathode 2 effect a positive-going voltage change or voltage pulse in algebraically additive relation to the negative bias voltage between the control grid 4 and cathode 2. Each such pulse permits a burst of electron flow from cathode 2 to anode 3, which forms at anode 3 a reproduction of the optical image projected onto cathode 2. Thus, each pulse supplied to cathode 2 momentarily "opens" the electron image tube "shutter" and provides one photographic exposure that is recorded by the film in camera 17. The duration of each exposure is equal to the pulse duration of the rectangular pulse supplied by exposure pulse generator 72, which can be adjusted by turning an adjustment knob 75 that is mechanically linked to a variable timing element within pulse generator 72. For example, the exposure duration, which is equal to the time interval $(t_{14}-t_1)$ of the first negative-going pulse of curve 76, can be increased by turning knob 75 in the "increase" direction. An increase in the time interval $(t_{14}-t_1)$ of the first pulse of curve 76 will also be accompanied by equal increases in the time intervals $(t_{15}-t_4)$, $(t_{16}-t_7)$, $(t_{17}-t_{10})$ and $(t_{18}-t_{13})$ of the succeeding pulses of curve 76.

The purpose of the delay line 48 in the system of Fig. 1 can be explained with reference to Fig. 6. As described hereinbefore, delay line 48 causes the third plurality of pulses 53 to be delayed from corresponding preceding pulses of the second plurality 52; the interval of delay is represented by the equal time intervals $(t_4-t_3)$, $(t_7-t_6)$, $(t_{10}-t_9)$, $(t_{13}-t_{12})$. Since each pulse of the third plurality 53 initiates a corresponding exposure pulse 76, it is clear that the initiation of each exposure pulse 76 (excepting the first) is delayed by the same time interval $(t_4-t_3)$, etc., from the times $t_3$, $t_6$, $t_9$, $t_{12}$ when the staircase waveform changes cease. The delay $(t_4-t_3)$ is necessary to eliminate the possible effect of potential disturbances occurring at times $t_3$, $t_6$, $t_9$, and $t_{12}$, associated with stopping of change in staircase waveform 57. If potential changes of waveform 57 occurred during the time the exposure pulses 76 were occurring, the image would be blurred by deflection. It is necessary, therefore, to substantially eliminate deflection potential changes during exposure. In the interval following the delay interval $(t_3-t_4)$, the potential $V_2$ remains substantially constant. The five intervals of substantially constant deflection potential during which exposure occurs are $(t_2-t_1)$, $(t_5-t_4)$, $(t_8-t_7)$, $(t_{11}-t_{10})$, and $(t_{18}-t_{13})$.

The five deflection potentials $V_1$, $V_2$, $V_3$, $V_4$, and $V_5$ also correspond to the five spatially separated image reproductions on anode 3. The five spatially separated image reproductions are recorded by camera 17 at five different locations on the photographic film within the camera, without any necessity to move any part of the camera or the film during an entire sequence of exposures. In this way as many as five successive photographs of a rapidly changing event, such as an explosion, can be made within a time interval as short as one microsecond. Further, the lack of motion in the parts of the camera and the film make it possible to initiate or synchronize the successive photographs from the action of the event itself, to within a fraction of a microsecond.

At the end of a sequence of exposures, sweep generator 54 can be reset for returning the deflection signals to their original values. With the sweep generator illustrated in Fig. 5, this occurs automatically in about 0.01 second, and therefore no special reset provisions are needed when only one deflection direction is employed. When two-directional deflection is employed as hereinafter explained, more rapid resetting of the sweep generator may be needed. This can be accomplished by momentarily closing a reset circuit (schematically represented in Fig. 1 by a switch 77) which connects a lead 78 to circuit ground and supplies a reset pulse to the sweep generator in a manner that it hereinafter more fully explained in connection with the detailed description of the sweep generator circuit.

Figure 7:
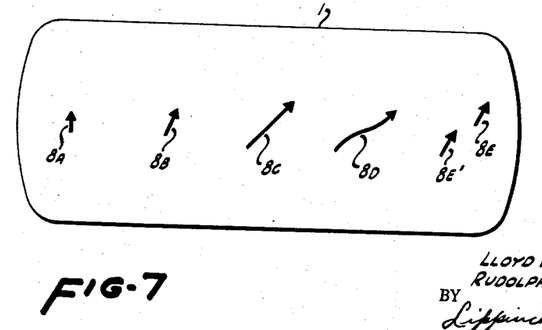
Fig. 7 schematically illustrates a plurality of spatially separated image reproductions produced by the Fig. 1 apparatus and representing temporarily separated aspects of a rapidly changing event.

Fig. 7 illustrates the spatial separation of the five optical images reproduced at anode 3. The small arrow 8A represents the aspect of event 8 during the time interval $(t_{14}-t_1)$ of the first exposure, provided by the first exposure pulse 76 that is supplied to cathode 2 by the exposure pulse generator 72. Arrow 8B represents the aspect of event 8 during the time interval $(t_{15}-t_4)$ of the second exposure, which may, for example, be about 0.25 microsecond after the first exposure. During this time, event 8 has grown larger and turned slightly. Arrow 8C represents the aspect of event 8 during the time interval $(t_{16}-t_7)$ of the third exposure, which may be 0.5 microsecond after the first exposure. Event 8 has grown still larger and has rotated through a slightly greater angle. Arrow 8D represents the aspect of event 8 during the time interval $(t_{17}-t_{10})$ of the fourth exposure, which may be 0.75 microsecond after the first exposure. At this time event 8 had bent into a somewhat twisted shape. The two arrows 8E and 8E' represent the aspect of event 8 during the time interval $(t_{18}-t_{13})$ of the fifth exposure, which may be one microsecond after the first exposure. The two arrows 8E and 8E' show that event 8 has broken into two parts at the time of the fifth exposure.

Each of the five exposures may be made with an effective exposure time as short as 20 millimicroseconds, which corresponds to about 20 feet of light passing through the "shutter" to the camera. Thus, motion is very effectively "stopped" in the photographs, even when photographing very fast-moving events. Of course, the time interval during which the photographic film within the camera is illuminated by each reproduced image may be considerably greater than the aforesaid effective exposure time, due to the persistence of light emission by cathodoluminescent anode 3 after the electron flow has been cut off. The persistence of the reproduced images depends upon the phosphors used in the construction of anode 3, and can be made relatively short or relatively long, as desired, by a suitable choice of phosphor materials, as is well known to those skilled in the art. Instead of, or in addition to, photographing the reproduced images, they may be visually observed, televised, or otherwise utilized.

Figure 2:
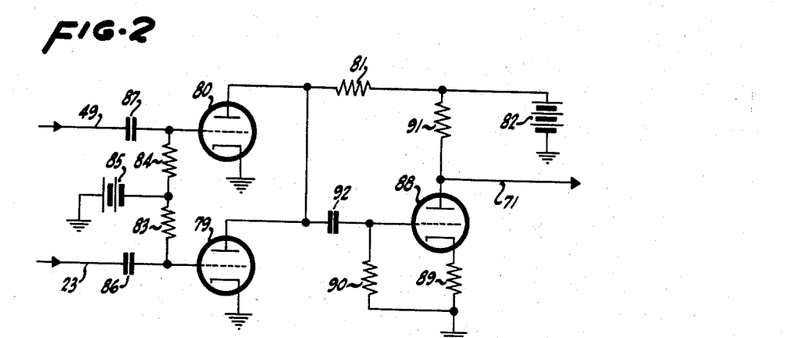
Figs. 2, 3, 4 and 5 are simplified circuit diagrams of parts of the Fig. 1 apparatus.

Fig. 2 is a simplified circuit diagram illustrating a typical form of buffer circuit 24. Two triode vacuum tubes 79 and 80 (which may be the two sections of a twin triode) have their cathodes connected to circuit ground and their anodes connected together through a common load resistor 81 to an anode voltage supply, represented by a battery 82. The control grids of tubes 79 and 80 are connected through grid leak resistors 83 and 84 to a source of negative bias voltage, represented by a battery 85, of sufficient magnitude that both vacuum tubes are normally cut off.

The initial positive-going electric pulse, supplied through lead 23 by the closing of switch 18 (Fig. 1), at time $t_1$ (Fig. 6), is transmitted through a coupling capacitor 86 to the control grid of triode 79 and causes tube 79 to conduct current momentarily, thereby producing a negative-going voltage pulse across load resistor 81. The third plurality of four successive positive-going voltage pulses supplied through lead 49 by the fixed delay device 48 (Fig. 1), is transmitted to the control grid of tube 80 through a coupling capacitor 87. Each of these four pulses causes tube 80 to conduct current momentarily, and produces a negative-going voltage pulse across load resistor 81. Thus, the initial pulse and the third plurality of four pulses are added to produce five successive negative-going pulses across load resistor 81.

A triode vacuum tube 88 is connected as a conventional voltage amplifier. The cathode of tube 88 is connected to circuit ground through a cathode resistor 89, the control grid is connected to circuit ground through a grid-leak resistor 90, and the anode of tube 88 is connected to anode voltage supply 82 through a load resistor 91. Each of the negative-going pulses produced across resistor 81 is transmitted through a coupling capacitor 92 to the control grid of tube 88. Tube 88 amplifies and reverses the polarity of these pulses, and supplies through lead 71 to the exposure pulse generator 72 (Fig. 1), five successive positive-going voltage pulses.

Figure 3:
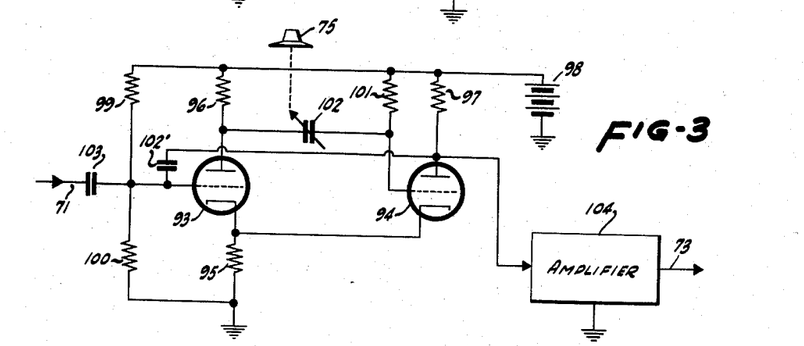

Fig. 3 illustrates a typical circuit for exposure pulse generator 72. This circuit consists essentially of a conventional monostable multivibrator and an amplifier. The monostable multivibrator comprises two triode vacuum tubes 93 and 94 (which may be the two halves of a twin triode) having their cathodes connected together and returned to circuit ground through a common cathode resistor 95. The two anodes are connected through respective load resistors 96 and 97 to an anode voltage supply, represented by a battery 98. The control grid of tube 93 is maintained at an intermediate potential by means of a voltage divider consisting of resistors 99 and 100 connected in series between the anode voltage supply and circuit ground, as shown. The control grid of tube 94 is connected to the anode voltage supply through a resistor 101, so that tube 94 is normally conductive while tube 93 is cut off by the voltage drop across cathode resistor 95. The control grid of tube 94 is connected to the anode of tube 93 through a variable capacitor 102. Another capacitor 102' may be added between the control grid of tube 93 and the anode of tube 94.

The positive-going pulses are supplied through lead 71 by buffer circuit 24 (Fig. 1) and are transmitted to the control grid of tube 93 through a coupling capacitor 103. Each such pulse causes tube 93 to conduct current momentarily, and the resulting voltage drop across load resistor 96 drives the control grid of tube 94 sufficiently negative to cut off tube 94. Consequently, tube 94 becomes non-conductive and tube 93 remains conductive until timing capacitor 102 has discharged sufficiently through timing resistor 101 for tube 94 to again conduct current, whereupon the circuit quickly returns to its initial operating state.

Thus, each positive-going voltage pulse supplied through lead 71 triggers the production of a positive-going rectangular waveform pulse across load resistor 97. These positive-going rectangular pulses are amplified and inverted in polarity by a conventional amplifier 104, and are transmitted as negative-going rectangular pulses (hereinbefore identified in Fig. 6 as exposure pulses 76) through lead 73 to the cathode of the electron image tube. The durations of the exposure pulses 76, and thus the duration of each photographic exposure provided by the electron image tube, can be adjusted by turning adjustment knob 75 to adjust the capacitance of variable timing capacitor 102. Alternatively, the pulse duration, and thus the exposure time, can be varied by adjusting the resistance of resistor 101; or, both the capacitance and the resistance can be adjusted.

Figure 4:
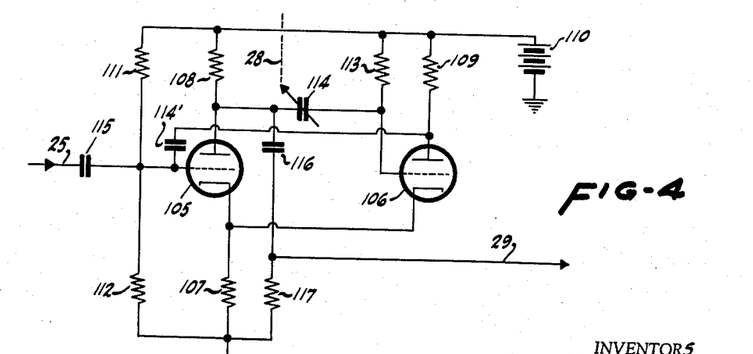

Fig. 4 is a typical circuit diagram for the variable delay circuit 26. Since substantially identical circuits may be used for all eight of the variable delay circuits, only one of these circuits will be described. The circuit illustrated in Fig. 4 is a substantially conventional monostable multivibrator. Triode vacuum tubes 105 and 106 (which may be the two sections of a twin triode) having their cathodes connected together and returned to circuit ground through a common cathode resistor 107. The two anodes are connected through respective load resistors 108 and 109 to an anode voltage supply, represented by a battery 110. The control grid of triode 105 is maintained at an intermediate potential by means of a voltage divider consisting of resistors 111 and 112 connected in series between the anode supply and circuit ground, as shown. The control grid of tube 106 is connected to the anode voltage supply through a resistor 113, so that tube 106 is normally conductive while tube 105 is cut off by the voltage drop across the cathode resistor 107. The control grid of tube 106 is connected to the anode of tube 105 through a variable timing capacitor 114. Another capacitor 114' may be added between the control grid of tube 105 and the anode of tube 106.

Each positive-going pulse supplied through lead 25 is transmitted to the control grid of tube 105 through a coupling capacitor 115. Each such pulse causes tube 105 to conduct current momentarily, and the resulting voltage drop across load resistor 108 drives the control grid of tube 106 sufficiently negative to cut off the conduction of current by tube 106. Tube 106 remains non-conductive until timing capacitor 114 has discharged sufficiently through timing resistor 113 to raise control grid potential of tube 106 above cut-off, whereupon the circuit quickly returns to its initial operating state. Consequently, each positive-going pulse that is supplied through lead 25 triggers the production of a negative-going rectangular waveform voltage pulse across load resistor 108.

These negative-going rectangular pulses are differentiated by a differentiating circuit consisting of a capacitor 116 and a resistor 117 connected in series between the anode of tube 105 and circuit ground, as shown. Lead 29 is connected to the circuit junction between capacitor 116 and resistor 117. At the beginning of each negative-going rectangular pulse across resistor 108, the differentiating circuit supplies to lead 29 a short negative-going pulse, which has no significant effect upon the subsequent circuit. At the end of the rectangular pulse across resistor 108, the anode potential of tube 105 suddenly rises substantially to the supply potential provided by battery 110, and the differentiating circuit transmits a sharp, short positive-going pulse to lead 29.

Thus, in response to each positive-going pulse supplied through lead 25, the monostable multivibrator supplies a positive-going pulse to lead 29 after a time delay substantially equal to the time interval during which tube 105 remains conductive. The amount of the time delay can be adjusted by adjusting the capacitance of timing capacitor 114, which is linked to adjustment knob 27 (Fig. 1) through linkage 28. Alternatively, the time delay can be adjusted by adjusting the resistance of timing resistor 113; or, both the capacitance and the resistance may be adjusted.

The use of monostable multivibrators for the variable delay circuits provides several advantages over other delay devices that might be considered, such as delay lines. In particular, the use of tandem-connected multivibrators avoids any deleterious attenuation or loss of sharpness in the pulses as they are transmitted through the chain of delay circuits. Furthermore, the amount of time delay provided by each delay circuit can be conveniently adjusted, either jointly or severally, over a continuous and substantial range of values without compromising circuit performance.

Figure 5:
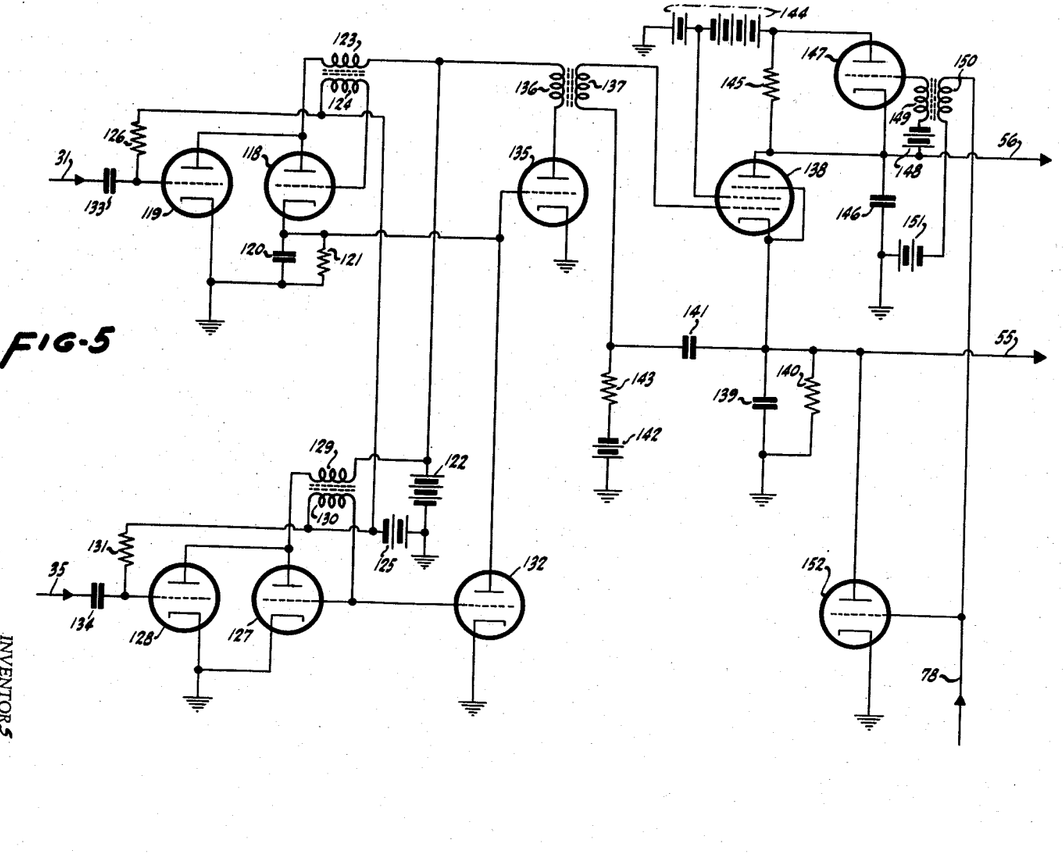

Fig. 5 is a typical circuit diagram for the sweep generator 54. A triode vacuum tube 118 operates as a blocking oscillator, while another triode vacuum tube 119 operates as a driver for triggering the blocking oscillator. The cathode of tube 118 is connected to circuit ground through a capacitor 120 and a resistor 121, connected in parallel, as shown. The capacitance and resistance values of capacitor 120 and resistor 121 are sufficiently large that the discharge of the capacitor through the resistor during the time intervals, under consideration is negligible. The cathode of tube 119 is directly connected to circuit ground. The anodes of tubes 118 and 119 are connected together, and are connected to an anode voltage supply 122 through the primary 123 of a pulse transformer. The secondary 124 of the same transformer is connected between the control grid of tube 118 and a negative bias voltage supply 125. The control grid of driver tube 119 is connected to negative bias supply 125 through a grid-leak resistor 126. Both tubes are normally cut off by the negative bias voltage supplied to their control grids.

Triode vacuum tubes 127 and 128 form another blocking oscillator and its driving stage. The cathodes of tubes 127 and 128 are both connected directly to circuit ground, and the two anodes are connected together and are connected to anode voltage supply 122 through the primary 129 of a pulse transformer. The secondary 130 of the same pulse transformer is connected between the control grid of tube 127 and negative bias supply 125. The control grid of tube 128 is connected to the negative bias supply through a grid-leak resistor 131. Both of the tubes 127 and 128 are normally cut off by the negative bias voltage supplied to their control grids.

Still another triode vacuum tube 132 has its cathode connected to circuit ground and its anode connected to the cathode of tube 118. The control grid of tube 132 is connected to the control grid of tube 127, so that tube 132 is normally cut off by the negative bias voltage provided by supply 125.

Each positive-going pulse of the first plurality that is supplied through lead 31 by the variable delay circuits (Fig. 1), is transmitted through a coupling capacitor 133 to the control grid of tube 119. Each such positive-going pulse causes a momentary conduction of current by tube 119, and the resulting current flow through primary 123 of the blocking oscillator transformer triggers the blocking oscillator comprising tube 118 and its associated circuitry in the customary manner. Operation of the blocking oscillator quickly charges capacitor 120 and provides a sudden rise in voltage across the capacitor. During the short time intervals under consideration, the loss of charge through resistor 121 is negligible.

Each positive-going pulse of the second plurality that is supplied through lead 35 by the variable delay circuits (Fig. 1), is transmitted to the control grid of tube 128 through a coupling capacitor 134. Each such positive-going pulse initiates a momentary conduction of current by tube 128, which triggers the blocking oscillator comprising tube 127 and associated circuitry, which drives the control grids of vacuum tubes 127 and 132 sufficiently positive for the two last-mentioned tubes to conduct current momentarily. The conduction of current by tube 132 discharges capacitor 120 and returns the cathode of tube 118 substantially to ground potential.

Thus, there is provided at the cathode of tube 118 a positive-going rectangular waveform voltage pulse that is initiated by a pulse of the first plurality transmitted through lead 31 and is terminated by the next following pulse of the second plurality transmitted through lead 35. Consequently, the number and the timing of the pulses at the cathode of tube 118 corresponds to the number and timing of the pulses of the first plurality, and the duration of the rectangular waveform pulses at the cathode of tube 118 corresponds to the time interval between each pulse of the first plurality and the next following pulse of the second plurality.

A triode vacuum tube 135 has its cathode connected to circuit ground, its control grid connected to the cathode of tube 118, and its anode connected to anode voltage supply 122 through the primary 136 of a pulse transformer. The secondary 137 of the same transformer is connected in a manner that is hereinafter explained. Tube 135 acts as an amplifier for supplying at secondary 137 an amplified positive-going rectangular waveform voltage pulse corresponding to each of the pulses produced at the cathode of tube 118. If desired, triodes 118, 119, 127, 128, 132 and 135 may be comprised in three twin-triode vacuum tubes.

A pentode vacuum tube 138 has its cathode connected to circuit ground through a capacitor 139 and a resistor 140 in parallel. The control grid of tube 138 is connected to the upper terminal of transformer secondary 137. The lower terminal of secondary 137 is connected to the cathode of tube 138 through a capacitor 141, and is connected to a negative bias voltage supply 142 through a resistor 143. The values of circuit elements 139, 140, 141 and 143 are sufficiently large that discharge of the capacitors through the resistors is negligible during the short operating cycles under consideration. Bias voltage supply 142 maintains the control grid of tube 138 sufficiently negative that tube 138 is normally cut off. The screen grid of tube 138 is connected to a large positive voltage (1,000 volts, for example) which can be obtained, for example, by a tap on the high voltage (10,000 volts, for example) supply 144, as shown. The anode of tube 138 is connected to voltage supply 144 through a load resistor 145. A capacitor 146 is connected between the anode of tube 138 and circuit ground. Leads 55 and 56 are connected to the cathode and anode, respectively, of tube 138.

At the beginning of an operating cycle, tube 138 is non-conductive due to the negative bias voltage supplied to its control grid by bias supply 142. The cathode of tube 138 is substantially at circuit ground potential, and the anode of tube 138 is substantially at the high positive potential provided by supply 144. During the operating cycle, the four pulses of the first plurality are transmitted through lead 131 to the control grid of tube 119, and the four pulses of the second plurality are transmitted through lead 35 to the control grid of tube 128. In the manner hereinbefore explained, a positive-going rectangular waveform pulse is provided across transformer secondary 137 beginning with each pulse of the first plurality and ending with the next following pulse of the second plurality. Thus, there is provided across secondary 137 four positive-going pulses each having a duration substantially equal to the time interval between each pulse of the first plurality and the next following pulse of the second plurality.

During each positive-going pulse that is provided across transformer secondary 137, tube 138 conducts current at a fixed rate. Thus, there are provided four pulses of current during each of which a fixed amount of charge flows from capacitor 146 to capacitor 139. During the short time intervals under consideration, the charge dissipation through resistors 140, 143 and 145 is negligible, and the voltage across capacitor 141 remains essentially constant. Each current pulse that flows through tube 138 provides an incremental increase in the charge of capacitor 139, and a corresponding incremental decrease in the charge of capacitor 146. Consequently, a positive-going staircase waveform voltage (curve 57 of Fig. 6) is provided across capacitor 139 and is transmitted through lead 55, while a corresponding negative-going staircase waveform voltage is provided across capacitor 146 and is transmitted through lead 56. The average control grid-to-cathode voltage of tube 138 is kept substantially constant during the operating cycle by capacitor 141, so that each successive one of the four pulses provided across transformer secondary 137 produces essentially the same fixed rate of current flow through tube 138.

At the end of an operating cycle, capacitor 139 slowly discharges through resistor 140, and capacitor 146 slowly recharges through resistor 145, so that the sweep circuit normally returns to its initial operating condition in about 0.01 second, without the provision of special resetting means. More rapid resetting (desirable when two-directional image deflection is employed, as hereinafter explained) can be accomplished in the following manner: A triode vacuum tube 147 has its cathode connected to the anode of tube 138 and has its anode connected to positive voltage supply 144. A negative bias supply, such as a battery 148, is connected in series with a pulse transformer secondary 149 between the cathode and the control grid of tube 147, so that tube 147 is normally cut off. The primary 150 of the same transformer is connected in series with a negative bias voltage supply, such as a battery 151, between circuit ground and the control grid of another triode vacuum tube 152. The control grid of tube 152 is also connected to reset lead 78. The anode of tube 152 is connected to the cathode of tube 138, and the cathode of tube 152 is connected to circuit ground. Tube 152 is normally cut off by the negative bias voltage provided by supply 151.

When the reset circuit (schematically represented by switch 77, Fig. 1) is closed, lead 78 is connected to circuit ground and tube 152 becomes conductive, thereby rapidly discharging capacitor 139. At the same time, current begins to flow through primary 150, and secondary 149 transmits a positive voltage pulse to the control grid of tube 147. Thereupon, tube 147 becomes conductive and rapidly recharges capacitor 146 to the potential of supply 144. It is understood that manual closing of switch 77 is for illustrative purposes only, since normal discharge of capacitors 139 and 146 occurs more quickly than it is possible to close switch 77 manually. In practice, electronic means may be employed to supply positive-going reset pulses to lead 78; for example, in the manner hereinafter described in connection with Fig. 8.

Figure 8:
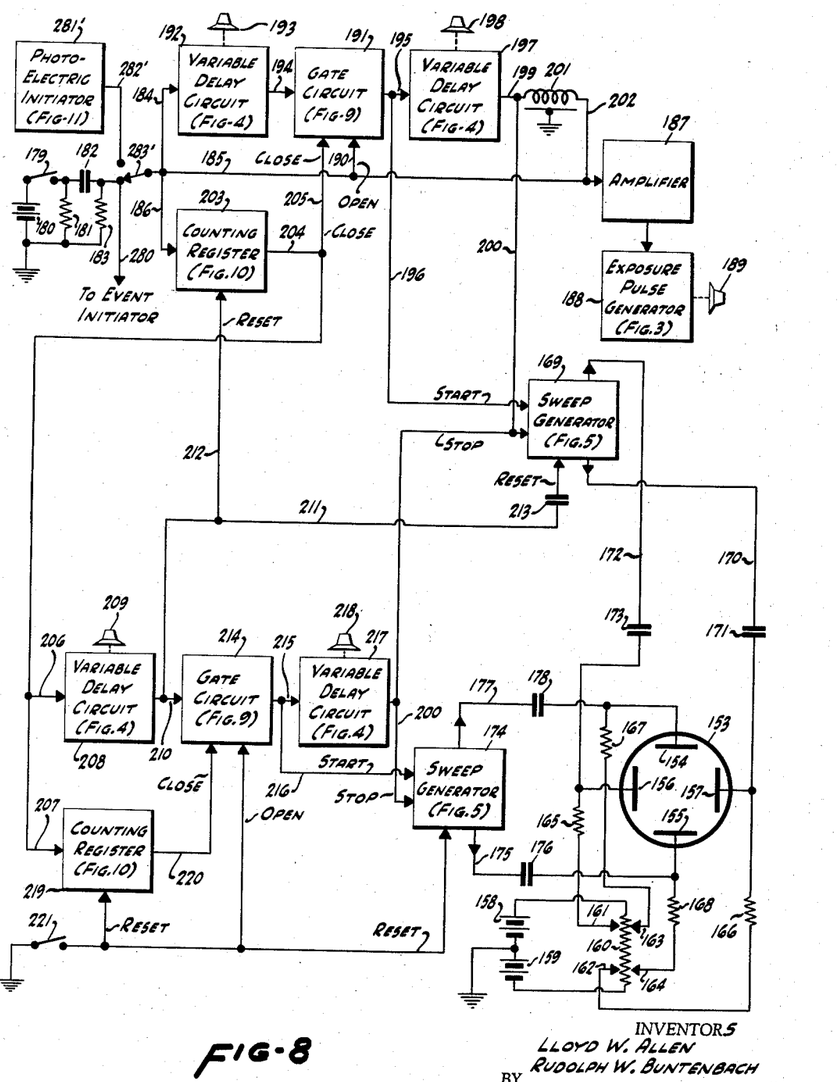
Fig. 8 is a schematic diagram of another improved high-speed multiple-exposure apparatus for reproducing successive aspects of a time-varying image, certain parts of the Fig. 8 apparatus being identical to parts illustrated in Figs. 1, 3, 4 and 5.

Reference is now made to Fig. 8 of the drawings, which illustrates an embodiment wherein the electron flow within the electron image tube is deflected both horizontally and vertically to provide a plurality of spatially separated reproduced images arranged in a plurality of rows and columns.

Electron image tube 153, illustrated in transverse section, may be identical to the electron image tube 1 illustrated in Fig. 1, except that tube 153 is provided with a pair of vertical deflection plates 154 and 155 in addition to the horizontal deflection plates 156 and 157. The electron image tube is also provided with an electron emissive cathode, a control grid, a cathodoluminescent anode, and focusing means, similar to those shown in Fig. 1, which are not illustrated in Fig. 5 for reasons of clarity and convenience.

The initial path of electron flow within the image tube is determined by bias voltages supplied to the four deflection plates, as follows: A voltage supply 158 provides an electric potential that is positive with respect to circuit ground, while a voltage source 159 provides an electric potential that is negative with respect to circuit ground. Connected across voltage sources 158 and 159 there is a potentiometer 160 (or a plurality of potentiometers in parallel or series-parallel) having four adjustable taps 161, 162, 163, and 164. Tap 161 is connected to horizontal deflection plate 156 through a resistor 165, tap 162 is connected to horizontal deflection plate 157 through a resistor 166, tap 163 is connected to vertical deflection plate 154 through a resistor 167, and tap 164 is connected to vertical deflection plate 155 through a resistor 168. The adjustment of the four taps determines which portion of the anode receives the first burst of electrons for forming the first reproduced image in a sequence of exposures. For example, the four taps may be so adjusted that the first reproduced image is formed in an upper left-hand portion of the anode.

A horizontal sweep generator 169 supplies a repetitive positive-going staircase waveform deflection signal to horizontal deflection plate 157 through a lead 170 and a capacitor 171, while supplying a corresponding repetitive negative-going staircase waveform deflection signal to horizontal deflection plate 156 through a lead 172 and a capacitor 173. A vertical sweep generator 174 supplies a positive-going staircase waveform deflection signal to vertical deflection plate 155 through a lead 175 and a capacitor 176, while supplying a corresponding negative-going deflection signal to vertical deflection plate 154 through a lead 177 and a capacitor 178.

Operation of the sweep generators is so timed that the deflection signals supplied by sweep generator 169 change between each of the successive exposures, while the deflection signals supplied by a sweep generator 174 change between each of several groups of exposures. Sweep generator 169 is reset automatically at each change in the deflection signals provided by sweep generator 174, so that the reproduced images appear at the cathodoluminescent anode of the electron image tube in a plurality of spatially separated rows and columns. For example, there may be four rows each containing four reproduced images, making a total of 16 image reproductions in a single sequence of exposures. Each of the two sweep generators 169 and 174 may be essentially identical to the sweep generator illustrated in Fig. 5 and hereinbefore described.

A sequence of exposures is initiated by an initial electric pulse supplied in any desired manner. For example, the closing of a switch 179 connects a voltage source 180 across a resistor 181 to provide a sudden voltage rise across the resistor. Responsive to this voltage rise, a capacitor 182 charges through a resistor 183 to provide an initial positive-going voltage pulse that is transmitted through leads 184, 185, and 186. The initial pulse may also be transmitted to a detonator or other device for initiating the event that is to be photographed. The initial pulse transmitted through lead 185 is amplified by a conventional amplifier 187 to trigger an exposure pulse generator 188. Pulse generator 188 may be identical to the pulse generator illustrated in Fig. 3 and hereinbefore described. It supplies a negative-going rectangular waveform potential pulse to the cathode of the electron image tube, for producing the first photographic exposure in the manner hereinbefore explained in connection with the Fig. 1 apparatus. The duration of the photographic exposure can be controlled by adjusting knob 189, in the manner hereinbefore explained.

The pulse transmitted through lead 185 also passes through a lead 190 and is effective to open a gate circuit 191, the purpose of which will become apparent as the description proceeds.

The initial pulse transmitted through lead 184 triggers a variable delay circuit 192, which may be identical to the variable delay circuit illustrated in Fig. 4 and hereinbefore described. After a time delay that depends upon the adjustment of knob 193, delay circuit 192 supplies a positive-going pulse through a lead 194 to gate circuit 191. Since the gate circuit is open, the positive-going pulse travels through gate circuit 191 to leads 195 and 196. The pulse transmitted through lead 196 acts as a "start" signal for sweep generator 169, and initiates changes in value of the deflection signals supplied by sweep generator 169 through leads 170 and 172 to the horizontal deflection plates of electron image tube 153.

The pulse transmitted through lead 195 triggers a variable delay circuit 197, which may be identical to the variable delay circuits illustrated in Fig. 4 and as hereinbefore described. After a time delay which may be adjusted by knob 198, delay circuit 197 supplies a positive-going pulse to leads 199 and 200. The pulse transmitted through lead 200 acts as a "stop" signal for sweep generator 169, and stops the changes in value of the deflection signals supplied to the horizontal deflection plates of the image tube. Since the deflection signals supplied by the sweep generator change at a constant rate, as hereinbefore explained, the adjustment of knob 198 to adjust the amount of time delay provided by delay circuit 197 controls the magnitude of each incremental change in value of the horizontal deflection signals, and thereby controls the horizontal spatial separation of the reproduced images in each row.

The pulse supplied to lead 199 is delayed a slight additional amount by a delay circuit 201 and is then transmitted through lead 202 into lead 185. Upon reaching lead 185, the delayed pulse follows several parallel paths. One of these paths leads to amplifier 187, which amplifies the delayed pulse and again triggers exposure pulse generator 188 to produce a second photographic exposure. Another path carries the delayed pulse back through lead 185 to lead 186, while a third path carries the delayed pulse back through lead 185 to lead 184. After passing through lead 184, the delayed pulse triggers variable delay circuit 192 and starts another sequence of operations during which sweep generator 169 is again started and stopped to change the horizontal deflection voltages, and another pulse is supplied through lead 202 to initiate a third photographic exposure. Thus operation proceeds in a regenerative, repetitive manner, and produces a plurality of spatially separated image reproductions arranged in a row across the upper portion of the cathodoluminescent anode of the electron image tube. The horizontal spacing of the reproduced images can be adjusted by adjusting knob 198. The time interval between successive exposures depends jointly upon the adjustment of knobs 193 and 198, and thus can be adjusted by adjusting knob 193 after knob 198 has been adjusted to give the desired spatial separation.

In the above-described sequence of operations, waveforms are produced that are similar to those illustrated in Fig. 6. Thus, curve 50 represents the initial pulse that is supplied through leads 184, 185 and 186; curve 51 (minus the fourth pulse) represents a first plurality of three successive pulses that is supplied through leads 195 and 196; curve 52 (minus the fourth pulse) represents a second plurality of three successive pulses that is supplied through leads 199 and 200; curve 53 (minus the fourth pulse) represents a third plurality of three successive pulses that is supplied through lead 202 by delay circuit 201; curve 57 (minus the last step) represents the staircase waveform voltage supplied through lead 170; and curve 76 (minus the fifth pulse) represents the four successive pulses supplied by exposure pulse generator 188.

Each pulse that is transmitted to amplifier 187 for producing a photographic exposure is also transmitted through lead 186 to a counting register 203. Consequently, register 203 counts the number of photographic exposures in each row. After a number of exposures determined by the design or adjustment of register 203, as hereinafter explained, the counting register supplies a positive-going electric pulse through a lead 204. This pulse is transmitted through a lead 205 and closes gate circuit 191, overriding any pulse that may be transmitted through lead 190. After the gate circuit has been closed, the next positive-going pulse transmitted to lead 194 by delay circuit 192 fails to pass through gate circuit 191, and the regenerative action hereinbefore described is interrupted. Thus the production of sequential reproduced images disposed in a row across the anode of the electron image tube is interrupted after a predetermined number of exposures has been made.

The pulse supplied through lead 204 by the counting register 203 is also transmitted through a lead 206 and a lead 207. The pulse transmitted through lead 206 triggers a variable delay circuit 208, which may be identical to the variable delay circuit illustrated in Fig. 4. After a time delay that depends upon the adjustment of knob 209, circuit 208 supplies a positive-going pulse to leads 210, 211, and 212. The pulse supplied to lead 211 is transmitted through a capacitor 213 to the reset circuit of sweep generator 169 for resetting the horizontal deflection signals to their initial values. The pulse supplied to lead 212 resets counting register 203 to its initial state. Consequently, the horizontal deflection circuits have now all been returned to their initial conditions.

The pulse supplied to lead 210 passes through an initially open gate circuit 214 to leads 215 and 216. The pulse transmitted through lead 216 acts as a "start" signal for vertical sweep generator 174, and initiates a change in the vertical deflection voltages supplied to the electron image tube. The pulse supplied to lead 215 triggers a variable delay circuit 217, which may be identical to the variable delay circuit illustrated in Fig. 4. After a time interval that depends upon the adjustment of knob 218, delay circuit 217 supplies a positive-going electric pulse to lead 200. The pulse supplied to lead 200 acts as a "stop" signal for sweep generator 174, and stops the changes in the vertical deflection signals. Thus, the amount of each incremental change in the vertical deflection signals depends upon the time interval between each pulse supplied to lead 216 and the next following pulse supplied to lead 200, and can be adjusted by adjustment of knob 218.

The pulse supplied to lead 200 also travels through lead 199 to delay line 201, and, after a short additional delay, it is transmitted through lead 202 to lead 185. From lead 185, the pulse passes to amplifier 187, which amplifies the pulse and produces still another exposure immediately below the first exposure that was produced by the initial pulse supplied by the closing of switch 179. Furthermore, the pulse supplied to lead 185 passes through lead 190 and opens gate circuit 191, and is also transmitted to leads 184 and 186. The pulse passing through lead 184 triggers variable delay circuit 192 and starts another sequence of operations for producing a second row of spatially separated image reproductions. Counting register 203 counts the number of image reproductions in the second row, and at the end of a predetermined count again supplies a pulse through lead 204 for repeating the above-described sequence of operation. The adjustment of knob 209, jointly with the adjustment of knob 218, determines the time interval between the last exposure of one row and the first exposure of the next row.

A counting register 219 counts the number of pulses supplied through lead 207. After registering a number of pulses that depends upon the design or initial setting of counting register 219, a positive-going pulse is provided through lead 220 that closes gate circuit 214. Upon the closing of gate circuit 214, the next pulse supplied through lead 210 is unable to pass through the gate circuit, and the entire sequence of operations comes to a halt. Thus, counting register 219 determines the number of rows of reproduced images, just as counting register 203 determines the number of reproduced images in each row. Assume that each of the counting registers 203 and 219 is designed or set to supply an output pulse upon the receipt of each fourth input pulse. Then four rows each containing four image reproductions will be formed at the anode of electron image tube 153 during each complete sequence of operations. Thus, the initial pulse provided by the closing of switch 179 initiates the production of 16 sequential image reproductions or exposures.

At the end of the sequence of 16 exposures, all of the circuits are in their initial states except sweep generator 174, gate circuit 214, and counting register 219. These circuits may be reset to their initial states by closing a reset switch 221, which connects the reset circuit of sweep generator 174 to ground and thereby supplies positive-going reset pulses to each of the three circuits that are to be reset. Since sweep generator 174 automatically resets itself in about 0.01 second, as hereinbefore explained in connection with Fig. 5, manual reset provisions 221 are not essential to repeated operation of the sweep generator, but are generally desirable for resetting counting register 219 and gate circuit 214.

Figure 9:
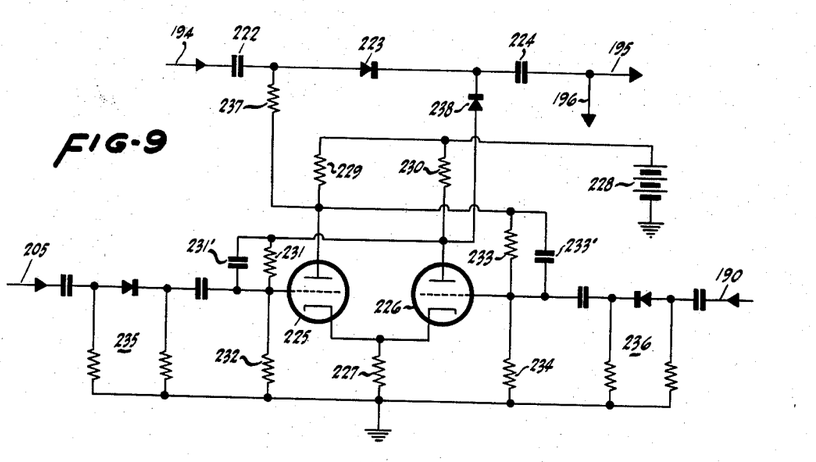
Figs. 9 and 10 are simplified circuit diagrams of other parts of the Fig. 8 apparatus.

A typical circuit diagram for each of the gate circuits 191 and 214 is illustrated in Fig. 9. Referring now to Fig. 9, which particularly illustrates gate circuit 191, leads 190, 194, 195, 196 and 205 are the same as the leads identified by corresponding reference numbers in Fig. 8. Lead 194 is connected to lead 195 through a capacitor 222, a crystal diode rectifier 223, and a capacitor 224, connected together in series, as shown.

A bistable multivibrator comprises two triode vacuum tubes 225 and 226 (which may be the two sections of a twin triode) having their cathodes connected together and returned to circuit ground through a common cathode resistor 227. The anodes of tubes 225 and 226 are connected to an anode voltage supply 228 through respective load resistors 229 and 230. A voltage divider composed of resistors 231 and 232 connected in series between the anode of tube 226 and circuit ground maintains the control grid of tube 225 at an intermediate potential. Another voltage divider composed of resistors 233 and 234 connected in series between the anode of tube 225 and circuit ground maintains the control grid of tube 226 at an intermediate potential. Capacitors 231' and 233' may be connected in parallel with resistors 231 and 233, respectively. As is well known, such a multivibrator has two stable states of operation. In one of these states, tube 225 is conductive while tube 226 is cut off by the negative potential of its control grid relative to the potential of the two cathodes. In the other stable state, tube 226 is conductive while tube 225 is cut off. The multivibrator can be triggered from one stable state to the other by pulses supplied to respective ones of the control grids. Lead 205 is connected to the control grid of tube 225 through a conventional input circuit 235 for transmitting positive pulses from lead 205 to the control grid of tube 225; and lead 190 is connected to the control grid of tube 226 through another conventional input circuit 236.

The circuit junction between capacitor 222 and rectifier 223 is connected to the anode of tube 225 through a resistor 237. The circuit junction between rectifier 23 and capacitor 224 is connected to the anode of tube 226 through a crystal diode rectifier 238. Rectifiers 223 and 238 are so poled that the circuit resistance of rectifier 23 is low while the circuit resistance of rectifier 238 is high when tube 226 is conducting current. That is to say, when the anode of tube 225 is positive relative to the anode of tube 226, current flows from the anode of tube 225 through resistor 237, the relatively low forward resistance of rectifier 223, and the relatively high backward resistance of rectifier 238 to the anode of tube 226. This is the "open" condition of the gate, since any positive-going pulse supplied through lead 194 at this time readily passes through capacitor 222, the low forward resistance of rectifier 223, and capacitor 224 to leads 195 and 196.

When tube 225 conducts current, the potential at the anode of tube 226 is positive relative to the anode of tube 225, and rectifier 223 presents a relatively high circuit resistance while rectifier 238 presents a relatively low circuit resistance. That is to say, current flows from the anode of tube 226 through the relatively low forward resistance of rectifier 238, the high backward resistance of rectifier 223, and resistor 237 to the anode of tube 225. This is the "closed" condition of the gate circuit, since any positive-going pulse supplied through lead 194 at this time is substantially blocked by the high backward resistance of rectifier 223 and is bypassed by the low effective resistance of rectifier 238, in consequence of which the pulse transmitted to leads 195 and 196 is of negligible amplitude.

The gate circuit can be switched from the closed to the open condition, and vice versa, by positive-going pulses supplied through leads 190 and 205, respectively. Whenever a positive-going pulse is supplied through lead 190, tube 226 becomes conductive and thereafter the gate circuit will transmit positive-going pulses from lead 194 to leads 195 and 196 with little reduction in the amplitude of the transmitted pulses. When a positive-going pulse is supplied through lead 205, tube 225 becomes conductive, and the gate is closed since thereafter pulses supplied through lead 194 will not be transmitted with appreciable amplitude to leads 195 and 196. If positive-going pulses of equal amplitudes are supplied to leads 190 and 205 simultaneously, the gate circuit will usually be switched from the condition existing immediately prior to such pulses to the other of its two conditions. When the gate circuits are used in the system illustrated in Fig. 8, the pulse amplitudes and circuit parameters are so adjusted that the gate always closes in response to a pulse through a lead 205.

Figure 10:
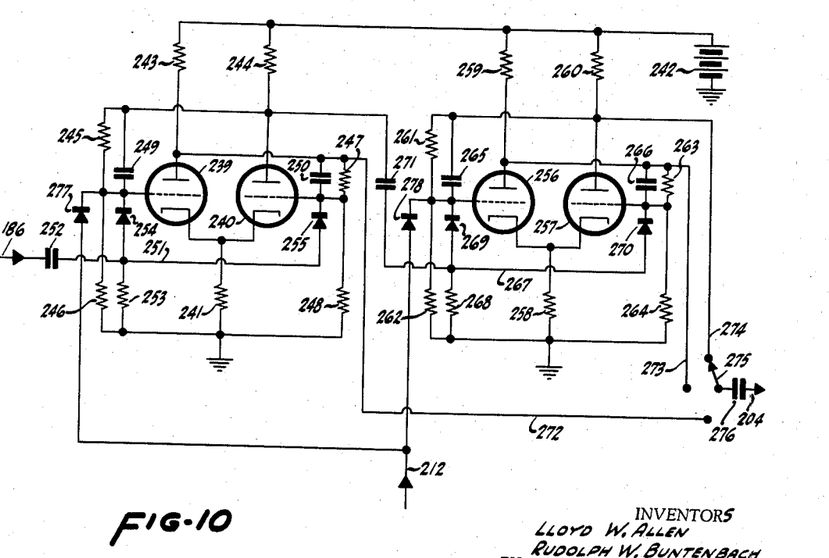

Fig. 10 is a circuit diagram of a typical counting register that may be used at 203 and 219 in the Fig. 8 apparatus. Specifically, Fig. 10 is a circuit diagram of counting register 203. In Fig. 10, leads 186, 204 and 212 are the same leads identified by the corresponding reference numbers in Fig. 8. The counting register consists essentially of two binary counting stages connected in tandem. The first binary counting stage comprises two triode vacuum tubes 239 and 240 (which may be the two sections of a twin triode) having their cathodes connected together and returned to circuit ground through a common cathode resistor 241. The anodes of tubes 239 and 240 are connected to an anode voltage supply 242 through load resistors 243 and 244, respectively. A voltage divider composed of resistors 245 and 246 connected in series between the anode of tube 240 and circuit ground maintains the control grid of tube 239 at an intermediate potential. A voltage divider composed of resistors 247 and 248 connected in series between the anode of tube 239 and circuit ground maintains the control grid of tube 240 at an intermediate potential. Capacitors 249 and 250 are connected in parallel with resistors 245 and 247, respectively.

Lead 186 is connected to a lead 251 through a coupling capacitor 252. Lead 251 is connected to circuit ground through a resistor 253, and is connected to the control grids of tubes 239 and 240 through respective ones of two crystal diode rectifiers 254 and 255 so poled that positive-going pulses are transmitted to the control grids. This circuit is a substantially conventional and well-known binary counting circuit. It has two stable operating states. In one such state, tube 239 conducts current while tube 240 is cut off. In the other state tube 240 conducts current while tube 239 is cut off. Each positive pulse supplied through lead 186 is transmitted to the control grids and triggers the circuit from one state to the other, so that the current is shifted back and forth from one to the other of tubes 239 and 240 responsive to a series of pulses supplied through lead 186.

The second binary counting stage is substantially identical to the first. The second stage comprises two triode vacuum tubes 256 and 257 (which may be the two sections of a twin triode) having their cathodes connected together and returned to circuit ground through a common cathode resistor 258. The anodes of tubes 256 and 257 are connected to anode voltage supply 242 through two load resistors 259 and 260, respectively. A voltage divider, composed of resistors 261 and 262 connected in series between the anode of tube 257 and circuit ground, maintains the control grid of tube 256 at an intermediate potential. Another voltage divider composed of resistors 263 and 264 connected in series between the anode of tube 256 and circuit ground maintains the control grid of tube 257 at an intermediate potential. Capacitors 265 and 266 are connected in parallel with respective ones of resistors 261 and 263.

A lead 267 is connected to circuit ground through a resistor 268, and is connected to the control grids of tubes 256 and 257 through respective ones of two crystal diode rectifiers 269 and 270 poled for the transmission of positive-going pulses from lead 267 to the control grids. Lead 267 is coupled to the anode of tube 240 of the first binary stage through a coupling capacitor 271.

The first binary counting stage supplies positive-going pulses through capacitor 271 to lead 267 responsive to alternate ones of the positive-going pulses supplied to the first stage through lead 186 and coupling capacitor 252. Each positive-going pulse supplied to lead 267 triggers the second binary counting stage from one to the other of its two stable states. Thus, the two binary counting stages are connected in tandem to form a scale-of-four counting register. A lead 272 is connected to the anode of tube 239. A lead 273 is connected to the anode of tube 256, and a lead 274 is connected to the anode of tube 257 for the transmission of output pulses as hereinafter explained.

Assume that tubes 239 and 256 are initially conductive. The first positive-going pulse received through lead 186 triggers the first binary stage and transfers the conduction of current from tube 239 to tube 240. Thereupon, the first binary stage transmits a positive-going pulse to lead 272. The second positive-going pulse received through lead 186 triggers the first binary stage and transfers the conduction of current from tube 240 back to tube 239. As the current flow through tube 240 is cut off, a positive-going pulse is transmitted through capacitor 271 to lead 267, which triggers the second binary stage and transfers the conduction of current from tube 256 to tube 257. When this happens, the second binary stage supplies a positive-going pulse to lead 273. The third positive-going pulse received through lead 186 triggers the first binary stage and transfers the conduction of current from tube 239 to tube 240. The fourth positive-going pulse received through lead 186 again triggers the first binary stage and transfers the conduction of current from tube 240 back to tube 239, whereupon the first binary stage transmits a positive-going pulse through capacitor 271 which triggers the second binary stage and transfers the conduction of current from tube 257 back to tube 256. As this happens, the second binary stage supplies a positive-going pulse through lead 274.

It is thus apparent that a positive-going pulse is supplied at lead 272 responsive to the first positive-going pulse received through lead 186 (and also responsive to the third such pulse received, which is immaterial); a positive-going pulse is supplied to lead 273 responsive to the second positive-going pulse received through lead 186; and a positive-going pulse is supplied to lead 274 responsive to the fourth positive-going pulse received through lead 186.

A switch 275 and a coupling capacitor 276 are provided for connecting any one of the three leads 272, 273 and 274, selectively, to output lead 204. Thus, depending upon the adjustment of switch 275, a positive-going output pulse can be provided at lead 204 responsive to the first, the second, or the fourth of a sequence of positive-going pulses received through lead 186. Accordingly, with reference to the Fig. 8 apparatus, adjustment of the switch 275 in counting register 203 can provide for one, two, or four image reproductions in each row of the spatially separated images reproduced by the electron image tube 153, and adjustment of the corresponding switch in counting register 219 can provide one, two, or four rows of reproduced images in a complete sequence of exposures.

The counting register 203 is reset to its initial condition (tubes 239 and 256 conducting) by a positive-going reset pulse supplied through lead 212. As illustrated in Fig. 10, this may be accomplished by connecting lead 212 to the control grids of tubes 239 and 256 through respective ones of two crystal diode rectifiers 277 and 278.

A considerable advantage of the multiple exposure photographic apparatus herein disclosed over prior-art cameras employing rotating prisms and the like is the facility and accuracy with which the present photographic apparatus can be synchronized with very rapid events that are to be photographed. One way to achieve such synchronization is to use the same triggering mechanism for supplying initiating electric pulses both to the photographic apparatus and to the event initiator. For example, in the Fig. 1 apparatus, an electric pulse can be supplied through lead 279 to a detonator or other device for initiating the explosion or other event that is to be photographed, so that the closing of switch 18 initiates the event and also sets the photographic apparatus into operation. If desired, delay circuits can be inserted in series with either or both of lead 279 and the leads from capacitor 22 to the photographic apparatus for achieving any desired time relation between the initiation of the event and the first photographic exposure. Similarly, in Fig. 8 apparatus the event that is to be photographed can be initiated by a pulse supplied through lead 280 upon the closing of switch 179. In this manner, the photographic exposures can be synchronized with the event photographed to an accuracy in the order of a microsecond.

In some cases, it may be more desirable to initiate the first photographic exposure when an optical image of the explosion or other event reaches a certain brightness, for example. For this purpose there is provided in the Fig. 1 apparatus a photoelectric initiator 281 having an output lead 282 which may be connected to leads 23 and 25 by the operation of a switch 283. When the photoelectric initiator is used, the explosion or other event may be initiated by closing switch 18, or by any other means. However, the circuit between switch 18 and the photographic apparatus is broken at switch 283, so that the closing of switch 18 does not set the photographic apparatus into operation. Instead, when an optical image of the explosion or other event reaches a certain brightness or position, photoelectric initiator 281 supplies an electric pulse through lead 282 and switch 283 that triggers the photographic apparatus into operation. Similarly, the Fig. 8 apparatus may be provided with an identical photoelectric initiator 281', lead 282' and switch 283'.

Figure 11:
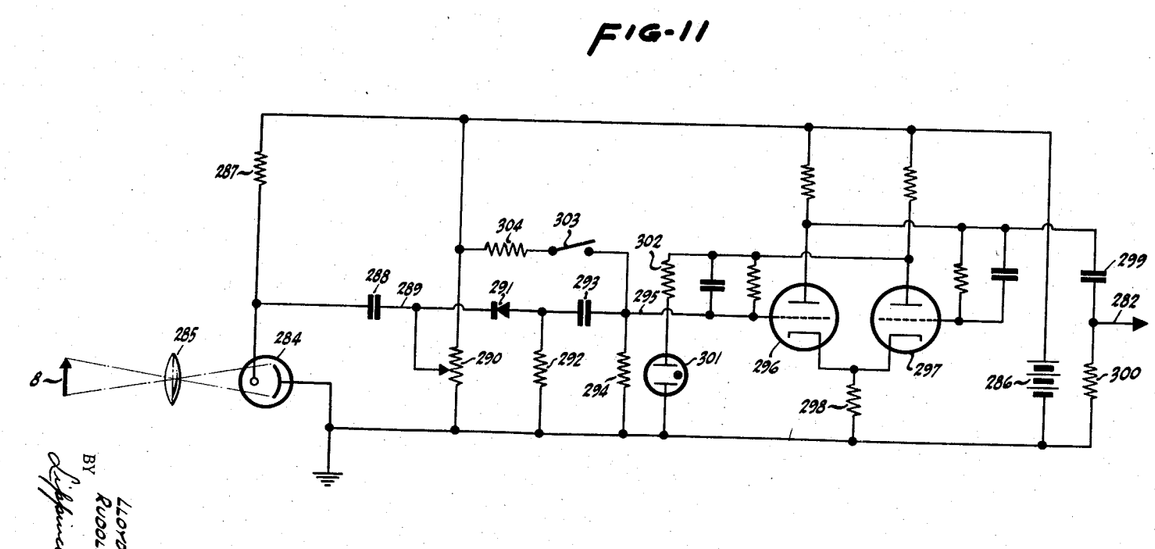
Fig. 11 is a circuit diagram of a photoelectric initiator which may be used in the circuits illustrated in Figs. 1 and 8.

A simplified circuit diagram of photoelectric initiator 281 is illustrated in Fig. 11. An optical image of event 8 is focused onto the cathode of a phototube 284 by a lens system 285. The anode of phototube 284 is connected to a conventional positive voltage supply 286 through a load resistor 287. As the optical image increases in brightness, the voltage drop across resistor 287 increases and a negative-going potential is transmitted through a coupling capacitor 288 to a lead 289. During the short time intervals now under consideration, usually in the order of a few microseconds, dissipation of the initial charge on capacitor 288 is negligible. Therefore, as the optical image progressively increases in brightness, the potential of lead 289 progressively becomes less positive.

Lead 289 is connected to an adjustable tap on a potentiometer 290 connected between positive voltage supply 286 and circuit ground, so that lead 289 is supplied with an adjustable positive bias potential. When the negative-going potential change transmitted through capacitor 288 becomes greater than the bias potential, a diode rectifier 291 becomes conductive and current flows through a resistor 292, connected as shown. Thereupon there is a sudden voltage drop across resistor 292, which is differentiated by a capacitor 293 and resistor 294, connected in series across resistor 292, to provide at lead 295 a negative-going voltage pulse. Thus, a voltage pulse is provided at lead 295 immediately upon the image at the cathode of phototube 284 reaching a brightness level (relative to the initial illumination of the phototube) selected by adjustment of the tap on potentiometer 290.

A conventional bistable multivibrator comprises two triode vacuum tube sections 296 and 297, which may be separate tubes or may be the two sections of a twin triode tube. The control grid of triode 296 is connected to lead 295. Initially, triode 296 is conductive and triode 297 is cut off by the voltage drop across the common cathode resistor 298. The negative-going pulse supplied to lead 295, as hereinbefore explained, triggers the multivibrator and causes triode 297 to become conductive while triode 296 is cut off. As this happens, there is a sudden rise in the anode potential of triode 296, and a differentiating circuit composed of a capacitor 299 and a resistor 300, connected as shown, supplies a positive voltage pulse to lead 282. Thus, a positive voltage pulse for setting the photographic apparatus (Fig. 1) into operation is supplied to lead 282 when an optical image of event 8 reaches a pre-selected brightness.

A neon indicator lamp 301 is connected in series with a resistor 302 between the anode of triode 297 and circuit ground, as shown. Lamp 301 is lit while triode 297 is cut off, and is extinguished when triode 297 becomes conductive. Lamp 301 is a "ready" indicator: when the lamp is lit the photoelectric initiator is ready to begin an operating cycle. When the lamp is extinguished, this indicates that the multivibrator must be reset to its initial state before the next operating cycle is started. Resetting is accomplished by momentarily closing a normally-open reset switch 303, which is connected in series with a resistor 304 between lead 295 and positive voltage supply 286.

In the foregoing description, it was assumed that the image of event 8 focused on the cathode of phototube 284 progressively increases in brightness, so that a pulse is automatically supplied to lead 282 when a pre-selected brightness level is reached. The photoelectric initiator may also be operated to supply a pulse to lead 282 upon the sudden appearance of an optical image at the cathode of the phototube. For example, the bias potential provided by potentiometer 290 may be set at a low value such that the multivibrator is triggered as soon as any image of event 8 appears at the phototube cathode. This may occur at the very beginning of event 8, or, when event 8 is a moving or spreading event, the optical system 285 may be focused on a selected location so that an image will suddenly appear at the cathode of phototube 284 when event 8 reaches said selected location in the course of its motion. By interchanging the positions of phototube 284 and resistor 287 in the electrical circuit, the photoelectric initiator can be modified to supply a pulse to lead 282 upon a decrease in the illumination of the phototube cathode, which may be desirable, for example, where event 8 is an opaque or light-absorbing body intervening between the phototube and a light source.

It should be understood that this invention in its broader aspects is not limited to specific examples herein illustrated and described, and that the following claims are intended to cover all changes and modifications within the true spirit and scope of the invention.

What is claimed is:

1. A control array for image-reproducing apparatus including an evacuated envelope containing a photoemissive cathode and a cathodoluminescent anode; means for projecting a time-varying optical image upon said cathode, said cathode being adapted to emit electrons in a time-varying pattern corresponding to said projected optical image; means for focusing said electrons upon said anode to reproduce the optical image at said anode; and a control grid within said envelope between said cathode and said anode; said array comprising the combination of means for providing between said grid and said cathode a negative bias voltage sufficient to cut off the flow of electrons between said cathode and said anode; means for receiving an initial electric pulse; means for providing first, second, and third pluralities of sequential electric pulses following said initial pulse in timed relation so that the pulses of said first, second and third pluralities occur alternately in the order named; means responsive to each pulse of said initial pulse and said third plurality for supplying a positive-going voltage pulse between said grid and said cathode in additive relation to said negative bias voltage so that a plurality of electron bursts flow from said cathode to said anode, the number of said bursts being one greater than the number of pulses of said third plurality; means for providing an electric deflection signal; means for deflecting said electron bursts to different portions of said anode responsive to the value of said deflection signal; and means for changing the value of said deflection signal between the respective pulses of said first plurality and the next following pulses of said second plurality, the value of said deflection signal remaining substantially constant between each pulse of said second plurality and the next following pulse of said first plurality; whereby a plurality of spatially separated reproductions of said projected optical image is produced at said anode, respective ones of said reproductions corresponding to a plurality of temporally separated aspects of said projected image.

2. Apparatus as defined in claim 1, additionally characterized in that said means for producing first, second, and third pluralities of sequential pulses comprises a plurality of electrical delay circuits connected in tandem responsive relation to said initial pulse.

3. Apparatus as defined in claim 2, additionally characterized in that said delay circuits are adjustable for individually adjusting the time interval between each pulse of said first plurality and the next following pulse of said second plurality and the time interval between each pulse of said third plurality and the next following pulse of said first plurality.

4. Apparatus as defined in claim 3, additionally comprising means for adjusting the duration of said positive-going voltage pulse supplied between said grid and said cathode.

5. In image-reproducing apparatus including an evacuated envelope containing a photoemissive cathode and a cathodoluminescent anode, means for projecting a time-varying optical image upon said cathode, said cathode emitting electrons in a time-varying pattern corresponding to said projected optical image, means for focusing said electrons upon said anode to reproduce said optical image at said anode, and a control grid within said envelope between said cathode and said anode; the combination comprising means for providing between said grid and said cathode a negative bias voltage sufficient to cut off the flow of electrons between said cathode and said anode; means for receiving an initial electric pulse; means for providing a first plurality of sequential electric pulses following said initial pulse in timed relation; means for providing another plurality of sequential electric pulses of which each pulse follows a corresponding pulse of said first plurality by a fixed time interval; means responsive to each pulse of said initial pulse and said last-mentioned plurality for supplying a positive-going voltage pulse between said grid and said cathode in additive relation to said negative bias voltage so that a plurality of electron bursts flow from said cathode to said anode, the number of said bursts being one greater than the number of pulses in said last-mentioned plurality; a capacitor adapted to receive an electric charge; means for changing the value of said charge by a fixed increment responsive to each pulse of said first plurality so that there is provided across said capacitor a staircase waveform voltage that changes in value between said positive-going voltage pulses and remains substantially constant in value during each of said positive-going voltage pulses; and means for deflecting said electron bursts to different portions of said anode responsive to said changes in value of said staircase waveform voltage; whereby a plurality of spatially separated reproductions of said projected optical image is produced at said anode, respective ones of said reproductions corresponding to a plurality of temporally separated aspects of said projected image.

6. A control array for image-reproducing apparatus including an evacuated envelope containing a photoemissive cathode and a cathodoluminescent anode, means for projecting a time-varying optical image upon said cathode, said cathode emitting electrons in a time-varying pattern corresponding to said projected optical image, means for focusing said electrons upon said anode to reproduce said optical image at said anode, and a control grid within said envelope between said cathode and said anode; said array comprising the combination of means for providing between said grid and said cathode a negative bias voltage sufficient to cut off the flow of electrons between said cathode and said anode; means for receiving an initial electric pulse; means for providing first, second and third pluralities of sequential electric pulses following said initial pulse in timed relation so that the pulses of said first, second and third pluralities occur alternately in the order named; means responsive to each pulse of said initial pulse and said third plurality for supplying a positive-going voltage pulse between said grid and said cathode in additive relation to said negative bias voltage so that a plurality of electron bursts flow from said cathode to said anode, the number of said bursts being one greater than the number of pulses in said third plurality; a capacitor; means for charging said capacitor at a fixed rate between each pulse of said first plurality and the next following pulse of said second plurality so that there is provided across said capacitor a staircase waveform voltage that changes in value between said positive-going voltage pulses and remains substantially constant in value during said positive-going voltage pulse; and means for deflecting said electron bursts to different portions of said anode responsive to said changes in value of said staircase waveform voltage; whereby a plurality of spatially separated reproductions of said projected optical image is produced at said anode, respective ones of said reproductions corresponding to a plurality of temporally separated aspects of said projected image.

7. Electrical waveform generation apparatus comprising the following combination: means for receiving an initial electric pulse; first and second variable delay circuits connected together in tandem responsive relation to said initial pulse, said first delay circuit providing a first delayed electric pulse following said initial pulse by an adjustably fixed time interval, said second variable delay circuit providing a second delayed electric pulse following said first delayed pulse by an adjustably fixed time interval; a capacitor adapted to receive an electric charge; means for changing the amount of said charge at a fixed rate between said first delayed pulse and said second delayed pulse to produce a step-like incremental voltage change across said capacitor; means for adjusting said first variable delay circuit to adjust the time interval between said initial pulse and the beginning of said incremental voltage change; and means for adjusting said second variable delay circuit to adjust the magnitude of said incremental voltage change; whereby there is provided a step-like voltage change of adjustable magnitude in adjustably timed relation to said initial pulse.

8. Electrical waveform generation apparatus comprising the following combination: means for receiving an initial electric pulse; first delay means for providing a first periodic plurality of sequential electric pulses following said initial pulse in timed relation; means for adjusting said first delay means to adjust the time interval between successive pulses of said first plurality; second delay means for producing a second periodic plurality of sequential electric pulses so timed that pulses of said first and second pluralities occur alternately, each pulse of said second plurality following the corresponding pulse of said first plurality by a fixed time interval; means for adjusting said second delay means to adjust said time interval between corresponding pulses of said first and second pluralities; a capacitor adapted to receive electric charge; means for changing the amount of said charge at a fixed rate between each pulse of said first plurality and the next following pulse of said second plurality to produce a staircase waveform voltage across said capacitor, there being an incremental change in the value of said voltage between each pulse of said first plurality and the next following pulse of said second plurality, the time interval between said incremental changes being adjustable by adjustment of said first delay means and the magnitude of each of said incremental changes being adjustable by adjustment of said second delay means; said voltage remaining substantially constant in value between respective pulses of said second plurality and the next following pulses of said first plurality; third delay means for producing a third plurality of electric pulses so timed that each pulse of said third plurality follows a corresponding pulse of said second plurality and precedes the next pulse of said first plurality, whereby each pulse of said third plurality occurs while said staircase waveform voltage is substantially constant in value.

9. Apparatus as defined in claim 1, additionally characterized in that said means for producing first, second and third pluralities of sequential pulses comprises: first, second and third electrical delay circuits connected in tandem responsive relation to said initial pulse; and a regenerative feedback circuit for transmitting pulses from said third delay circuit to said first delay circuit so that pulses circulate repetitively through said delay circuits and each delay circuit supplies a periodic sequence of electric pulses.

10. Apparatus as defined in claim 9, additionally comprising: a gate circuit connected in series with said delay circuits for interrupting the circulation of pulses therethrough; and pulse-counting means connected to count the number of pulses circulated through said delay circuits and to open said gate circuit upon the completion of a preset count; whereby the number of pulses in each of said sequences is automatically regulated.

11. Apparatus as defined in claim 1, additionally comprising: means for providing an additional pulse responsive to a preset number of pulses of said third plurality; means for resetting the aforesaid deflection signal to an initial value responsive to said additional pulse; means for providing an additional electric deflection signal; means for deflecting said electron bursts to different portions of said anode responsive to the value of said additional electric deflection signal, said first-mentioned deflection signal and said additional deflection signal respectively deflecting said bursts in two mutually perpendicular directions on said anode; and means for changing the value of said additional deflection signal responsive to said additional pulse; whereby said spatially separated reproductions are arranged in a plurality of rows and columns.

12. Apparatus as defined in claim 1, additionally comprising photoelectric means for supplying said initial pulse responsive to an aspect of said projected optical image.

13. Apparatus as defined in claim 1, additionally comprising: means for supplying an electric signal related in value to the brightness of said projected optical image; means for supplying an adjustable bias potential; and means jointly responsive to said last-mentioned signal and said bias potential for supplying said initial pulse; whereby said apparatus is set into operation when said projected image reaches a preset brightness.

14. Apparatus as defined in claim 1, additionally comprising: means responsive to said initial pulse for initiating a time-varying event, said projected image being an optical image of said event.

References Cited in the file of this patent

UNITED STATES PATENTS

| | | |
|---|---|---|
| 2,692,300 | Hogan | Oct. 19, 1954 |
| 2,808,768 | Squassoni | Oct. 8, 1957 |
| 2,856,128 | Ferre | Oct. 14, 1958 |
| 2,859,377 | Clemens et al. | Nov. 4, 1958 |
| 2,871,400 | Buntenbach | Jan. 27, 1959 |

FOREIGN PATENTS

| | | |
|---|---|---|
| 709,192 | Great Britain | May 19, 1954 |